(12) United States Patent
Williams et al.

(10) Patent No.: US 10,188,979 B2
(45) Date of Patent: Jan. 29, 2019

(54) FILTER WITH OPTIMIZED FLUID FLOWS

(71) Applicant: Norgren Limited, Staffordshire (GB)

(72) Inventors: Patrick Williams, Birmingham (GB); Gurdeep Singh Ghatora, Birmingham (GB)

(73) Assignee: Norgren Limited, Staffordshire (GB)

( * ) Notice: Subject to any disclaimer, the term of this patent is extended or adjusted under 35 U.S.C. 154(b) by 684 days.

(21) Appl. No.: 14/767,085

(22) PCT Filed: Feb. 26, 2014

(86) PCT No.: PCT/GB2014/050569
§ 371 (c)(1),
(2) Date: Aug. 11, 2015

(87) PCT Pub. No.: WO2014/132051
PCT Pub. Date: Sep. 4, 2014

(65) Prior Publication Data
US 2016/0001217 A1    Jan. 7, 2016

(30) Foreign Application Priority Data

Feb. 27, 2013 (GB) .................................. 1303496.2

(51) Int. Cl.
*B01D 53/02* (2006.01)
*B01D 53/04* (2006.01)
*B01D 53/26* (2006.01)

(52) U.S. Cl.
CPC ..... *B01D 53/0407* (2013.01); *B01D 53/0415* (2013.01); *B01D 53/0446* (2013.01); *B01D 53/261* (2013.01); *B01D 2257/80* (2013.01); *B01D 2259/40086* (2013.01)

(58) Field of Classification Search
CPC ...... B01D 2257/80; B01D 2259/40086; B01D 53/0407; B01D 53/0415; B01D 53/0446; B01D 53/261
See application file for complete search history.

(56) References Cited

U.S. PATENT DOCUMENTS

| | | | |
|---|---|---|---|
| 3,469,706 A * | 9/1969 | Kissell | B01D 35/02 210/448 |
| 3,483,677 A | 12/1969 | Pinto | |
| 4,750,923 A | 6/1988 | Haruta et al. | |
| 2003/0140793 A1 | 7/2003 | Lacey | |
| 2005/0188848 A1 | 9/2005 | Salzman et al. | |
| 2007/0251391 A1 | 11/2007 | Thomas | |
| 2007/0283811 A1 | 12/2007 | Wu | |
| 2014/0373714 A1 * | 12/2014 | Cloud | B01D 46/0031 95/273 |

FOREIGN PATENT DOCUMENTS

| | | |
|---|---|---|
| DE | 10355928 A1 | 6/2005 |
| EP | 0174919 A2 | 3/1986 |
| EP | 1275432 A1 | 1/2003 |

* cited by examiner

*Primary Examiner* — Christopher P Jones
(74) *Attorney, Agent, or Firm* — The Ollila Law Group LLC

(57) ABSTRACT

A filter (100) with optimized fluid flows to remove one or more components from a fluid is provided according to the invention. The filter (100) includes a filtering media tube (102) adapted to remove the one or more components from the fluid while the fluid is flowing through the filtering media tube (102), and an inlet cap (104) adapted to receive and substantially uniformly distribute the fluid to the filtering media tube (102).

13 Claims, 8 Drawing Sheets

FILTER WITH OPTIMIZED FLUID FLOWS

CROSS-REFERENCE TO RELATED APPLICATIONS

This is a National Stage entry of International Application No. PCT/GB14/50569, with an international filing date of Feb. 26, 2014, which claims priority of Great Britain provisional patent application no. 1303496.2, filed Feb. 27, 2013, entitled "FILTER WITH OPTIMIZED FLUID FLOWS".

BACKGROUND OF THE INVENTION

1. Field of the Invention

The invention is related to the field of fluid systems, and more particularly, to filters.

2. Description of the Prior Art

Equipment may employ fluids such as clean dry air (CDA) to perform various functions in different industries. In the rail industry, rail cars may employ CDA to operate pneumatic systems. The pneumatic systems may control parts that perform the various functions on the rail cars. For example, the pneumatic system may control brakes to stop the rail car. In the semiconductor industry, manufacturing equipment may employ pressurized CDA to operate valves to open and close ports. For example, multi-chamber wafer processing equipment may employ the ports to isolate each chamber from a central platform while still allowing a robot on the central platform to place and remove a wafer in the chamber. These are just exemplary industries and do not limit the scope of this application.

It is desirable that the CDA (or other appropriate fluid) not adversely affect the parts in the equipment. To ensure that the CDA does not adversely affect the parts, the CDA should be substantially free of moisture and other undesirable components such as particulates. CDA that is free of moisture and other undesirable components is less likely to cause corrosion or other adverse effects on the pneumatic system or components. For example, particulates may be abrasive to moving components, such as valves, in the pneumatic system. Reducing the adverse effects on a pneumatic system may extend the operating life of the pneumatic system.

Filters are often employed to remove one or more components from the fluid. For example, filters may remove moisture from compressed air to provide CDA to the pneumatic system. Also, filters may be employed by the equipment that uses the CDA because it may not be feasible to store CDA. More specifically, the filter receives compressed air from a source, filters the air and provides CDA to the equipment as the equipment requires (e.g., when the pneumatic system is controlling the equipment). Sometimes, the equipment will take and compress air from the environment and provide it to the filters. The filters may include material that adsorbs moisture from the compressed air provided by the equipment. In filters, desiccant beads or membranes are employed to adsorb the moisture from the air. Although this discussion is directed to removing moisture from air by adsorption, the filters may employ any appropriate means of removing any components from a fluid needed by the equipment. By employing the filters, the equipment may obtain CDA while in operation.

However, the filters may have undesirable characteristics. For example, operating ranges of the filters may be undesirably narrow. In particular, the filtering media in the filters may require a narrow fluid flow rate which may render the filtering media unsuitable for equipment that may require a wide range of fluid flow rates. A wider operating range for the filters would allow a filter to be used in a larger variety of equipment.

The filters may also require frequent planned maintenance. For example, the filters may require replacement more frequently than the other parts in the equipment. In other words, the frequency of the planned equipment downtime may be dictated by the filters rather than the parts in the equipment. Also, the filters may not reliably adsorb moisture from the air unless the filters are oriented in a desired manner. For example, in filters that employ desiccant beads, the air may bypass the desiccant beads if the filters are not oriented vertically. This may prevent use of the desiccant bead filters in equipment that changes orientation during operation.

It has also been found that the filters may be prone to failure thereby causing unexpected equipment downtime. For example, the filters may become unexpectedly saturated with moisture. The saturation may cause an undesirable pressure drop or increase in the amount of moisture in the CDA provided to the equipment. Unexpected pressure drops in the CDA supplied by the filter can cause the pneumatic system to cease functioning thereby causing parts in the equipment to not function. In filters that employ desiccant beads, the beads may be prone to degrading and creating particulates due to vibration of the beads. The particulates may be carried by the CDA to the equipment. The particulates may also obstruct the air flow through the filter.

Equipment downtime, particularly downtime associated with sophisticated equipment automated by pneumatic systems, is very costly. For example, rail cars not being used to transport cargo while filters are being replaced may have opportunity costs that range from hundreds to several thousands of dollars an hour. Even seemingly modest improvements in reducing equipment downtime can result is considerable savings when the same improvements are employed over hundreds or thousands of similarly situated pieces of equipment. Moreover, unexpected downtime of the equipment may result in large scale disruptions such as shutting down a manufacturing facility or rail systems. Hence, significant financial benefits may be realized by reducing equipment downtime.

What is needed, therefore, is a more reliable filter.

ASPECTS OF THE INVENTION

In some aspects of the invention, a filter (100) with optimized fluid flows to remove one or more components from a fluid comprises a filtering media tube (102) adapted to remove the one or more components from the fluid, and an inlet cap (104) adapted to receive and substantially uniformly distribute the fluid to the filtering media tube (102).

Preferably, the filter (100) wherein the inlet cap (104) is coupled to the filtering media tube (102).

Preferably, the filter (100) wherein the inlet cap (104) is further adapted to receive the fluid with a fluid flow that is substantially transversal to a major axis X of the filter (100).

Preferably, the inlet cap (104) further includes an inlet baffle (304) adapted to substantially uniformly distribute the fluid to the filtering media tube (102).

Preferably, the inlet cap (104) further includes an inlet spacer (310) adapted to allow the fluid to pass while retaining a filtering media (206) in the filtering media tube (102).

In some aspects of the invention, a method of forming a filter (100) with optimized fluid flows to remove one or more components from a fluid comprises providing a filtering media tube (102) to remove the one or more components from the fluid, and forming an inlet cap (104) to receive and substantially uniformly distribute the fluid to the filtering media tube (102).

Preferably, the method of forming the filter (100) further comprises coupling the inlet cap (104) to the filtering media tube (102).

Preferably, the method of forming the filter (100) further comprises forming the inlet cap (104) to receive the fluid with a fluid flow substantially transversal to a major axis X of the filter (100).

Preferably, the method of forming the filter (100) wherein forming the inlet cap (104) includes forming an inlet baffle (304) adapted to substantially uniformly distribute the fluid to the filtering media tube (102).

Preferably, the method of forming the filter (100) includes forming an inlet spacer (310) adapted to allow the fluid to pass while retaining a filtering media (206) in the filtering media tube (102).

In some aspects of the invention, a filter (100) with optimized fluid flows to remove one or more components from a fluid, comprises a filtering media tube (102) adapted to remove the one or more components from the fluid, and an outlet cap (106) adapted to receive fluid from the filtering media tube (102) and allow a forward fluid flow while limiting a reverse fluid flow of the fluid.

Preferably, the filter (100) wherein the outlet cap (106) is coupled to the filtering media tube 102.

Preferably, the outlet cap (106) is further adapted to allow a purge fluid flow.

Preferably, the outlet cap (106) includes a plunger (702) adapted to allow the forward fluid flow of the fluid through while limiting the reverse fluid flow.

In some aspects of the invention, a method of forming a filter (100) with optimized fluid flows to remove one or more components from a fluid comprises providing a filtering media tube (102) to remove the one or more components from the fluid, forming an outlet cap (106) to receive the fluid from the filtering media tube (102) and allow a forward fluid flow while limiting a reverse fluid flow of the fluid.

Preferably, the method further comprises coupling the outlet cap (106) to the filtering media tube (102).

Preferably, the forming the outlet cap (106) includes forming a plunger (702) adapted to allow a forward fluid flow while limiting a reverse fluid flow of the fluid.

In some aspects of the invention, a filter (100) with optimized fluid flows to remove one or more components from a fluid comprises a filtering media tube (102) to remove one or more components from the fluid and an outlet cap (106) adapted to receive the fluid from the filtering media tube (102) and prevent an undesired fluid flow rate of the fluid.

Preferably, the filter (100) wherein the outlet cap (106) is coupled to the filtering media tube (102).

Preferably, the outlet cap (106) includes an outlet nozzle (712) adapted to prevent the undesired fluid flow rate of the fluid.

Preferably, the outlet nozzle (712) includes a profile on an inner surface that is selected to prevent the undesired fluid flow rate of the fluid.

In some aspects of the invention, a method of forming a filter (100) with optimized fluid flows to remove one or more components from a fluid comprises forming a filtering media tube (102) to remove one or more components from the fluid, and forming outlet cap (106) adapted to receive the fluid from the filtering media tube (102) and prevent an undesired fluid flow rate of the fluid.

Preferably, the forming the filter (100) further comprises coupling the outlet cap (106) to the filtering media tube (102).

Preferably, the forming the outlet cap (106) includes forming outlet nozzle (712) adapted to prevent the undesired fluid flow rate of the fluid.

Preferably, the forming the outlet nozzle (712) includes forming a profile on an inner surface on the outlet nozzle (712) that is selected to prevent the undesired fluid flow rate of the fluid.

In some aspects of the invention, a method of removing one or more components from a fluid with a filter (100) with optimized fluid flows having a major axis X comprises uniformly distributing the fluid to a filtering media tube (206), and filtering the one or more components from the fluid.

Preferably, the method further comprises receiving the fluid in a direction substantially transversal to the major axis X of the filter (100).

Preferably, the method wherein the uniformly distributing the fluid to the filtering media includes distributing the fluid with a flow substantially parallel with the major axis X of the filter (100).

In some aspects of the invention, a method of removing one or more components from a fluid with a filter (100) with optimized fluid flows comprises removing the one or more components from the fluid, and allowing a forward fluid flow while limiting a reverse fluid flow of the fluid.

Preferably, the method wherein allowing the forward fluid flow while limiting the reverse fluid flow of the fluid includes moving a plunger (702) in the same direction as the forward fluid flow.

Preferably, the moving the plunger (702) includes depressing a plunger spring with the plunger (702).

In some aspects of the invention, a method of removing one or more components from a fluid with a filter (100) with optimized fluid flows comprises removing the one or more components from the fluid, and preventing an undesired fluid flow rate of the fluid.

Preferably, the preventing the undesired fluid flow includes preventing the undesired fluid flow rate of the fluid with an outlet nozzle (712).

In some aspects of the invention, a method of removing undesirable components from a filter (100) with optimized fluid flows comprises flowing a purge fluid through an outlet cap (106) adapted to allow a forward flow while limiting a reverse fluid flow of the fluid.

Preferably, the flowing the purge fluid includes flowing the purge fluid through one or more purge flow orifices (714).

Preferably, the flowing the purge fluid includes pressing a plunger (702) in the direction of the purge fluid flow.

BRIEF DESCRIPTION OF THE DRAWINGS

The same reference number represents the same element on all drawings. It should be understood that the drawings are not necessarily to scale.

DETAILED DESCRIPTION OF THE INVENTION

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
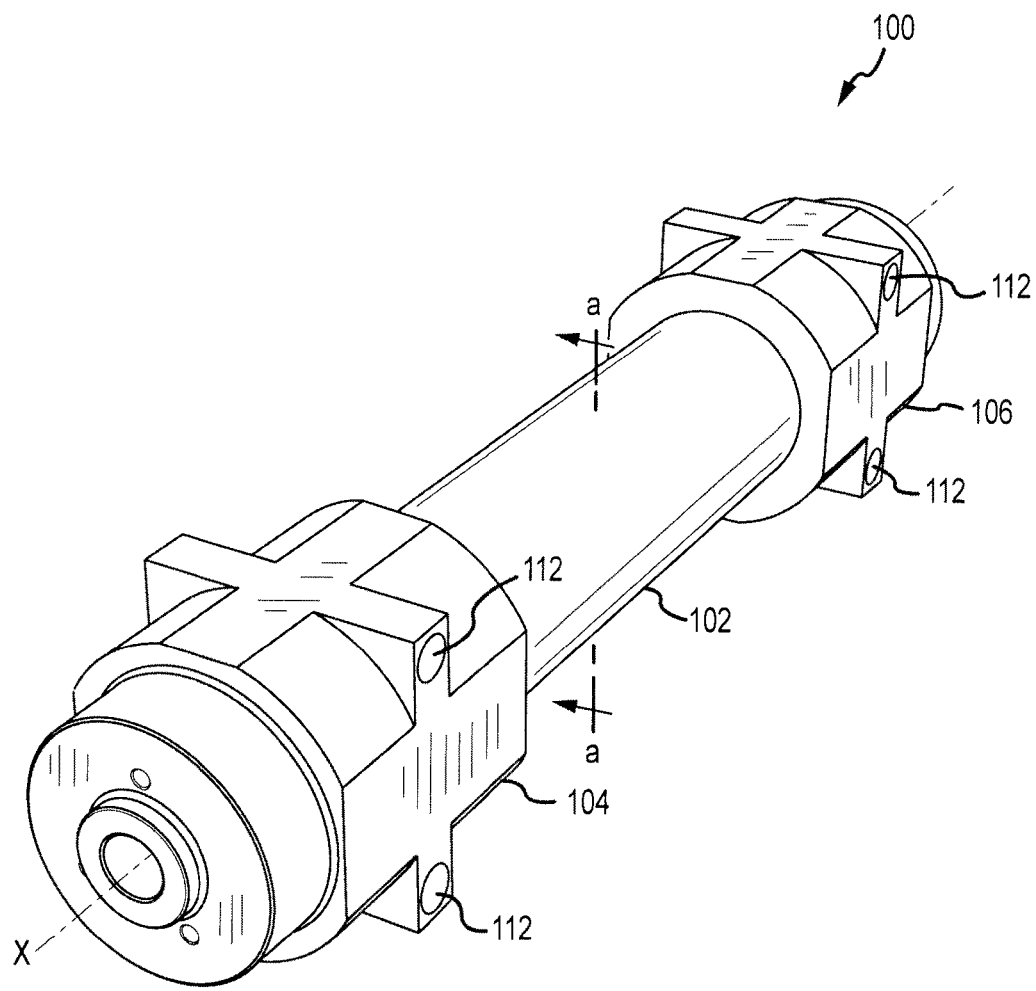
FIG. 1 shows perspective view of a filter 100 according to the invention.

FIG. 1 shows perspective view of a filter 100 with optimized fluid flows according to the invention. The filter 100 comprises a filtering media tube 102 coupled to an inlet cap 104 and an outlet cap 106. The filter 100 may be coupled to equipment via thru holes 112. The filtering media tube 102, inlet cap 104, and outlet cap 106 are depicted as cylindrical and arranged coaxially with a major axis X of the filter 100.

The equipment may employ the filter 100 to remove one or more components from a fluid. For example, the filter may remove moisture from compressed wet air (CWA) to provide CDA. Generally, the inlet cap 104 distributes the CWA to the filtering media tube 102. The filtering media tube 102 removes the moisture from the CWA to provide CDA to the outlet cap 106. The outlet cap 106 provides CDA to the equipment. Although the filter 100 is described as removing moisture from the CWA to provide CDA, embodiments provided in accordance with the invention may receive any fluid, filter one or more components from the fluid, and provide the fluid to the equipment.

The filter 100 removes the one or more components with optimized fluid flows. For example, the inlet cap 104 may receive the fluid flow substantially transversal to the major axis X and substantially uniformly distribute the fluid to the filtering media tube 102. The outlet cap 106 may prevent an undesirable fluid flow rate. The outlet cap 106 may also allow a forward fluid flow while limiting a reverse fluid flow as well as allow a purge fluid flow. As a result of these and other optimized fluid flows, the filter 100 more reliable than prior art filters.

It is appreciated that substantially uniformly distribute does not mean a perfectly uniformly distributed fluid. For example, the substantially uniformly distributed fluid may include fluids with less dense portions at the inner surface of the filtering media tube 102. A substantially uniformly distributed fluid may also include fluids that are discontinuous such as when the fluid is distributed to filtering media tubes 102 that have a hollow in the middle. The substantially uniformly distributed fluid includes any fluids distributed to provide a more reliable filter by, for example, optimally utilizing the filtering media tube 102. The filter 100 with optimized fluid flows is described in more detail in the following with reference to FIGS. 2-8.

Figure 2:
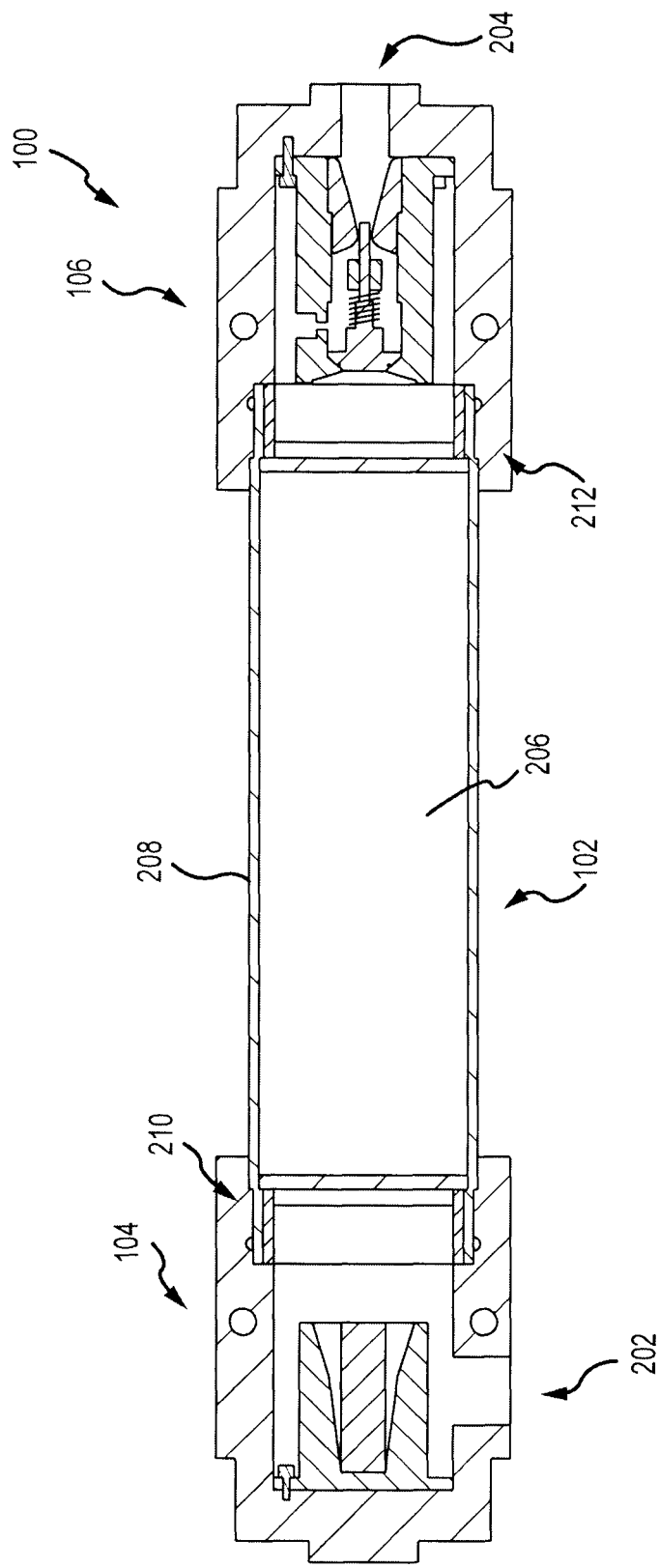
FIG. 2 shows a cross sectional view at section a-a in FIG. 1 of the filter 100 according to the invention.

FIG. 2 shows a cross sectional view of the filter 100 at section a-a in FIG. 1 according to the invention. As depicted, the inlet cap 104 includes an inlet opening 202 that receives and distributes the CWA to the filtering media tube 102. The outlet cap 106 includes an outlet 204 that provides the CDA to equipment that employs the CDA. The filtering media tube 102 includes a filtering media 206 surrounded by a housing 208. The housing 208 includes a housing inlet surface 210 and a housing outlet surface 212.

The inlet opening 202 is adapted to receive a fluid. For example, CWA may enter the inlet cap 104 through the inlet opening 202. The inlet opening 202 is depicted as a simple through hole although any suitable forms of receiving CWA (or any applicable fluid) into the inlet cap 104 may be employed. For example, the inlet opening 202 may include threads that are adapted to couple to a threaded fitting. The threaded fitting may couple to poly tubes that convey pressurized CWA to the filter 100. As will be described in the following, the inlet opening 202 may also be employed in the same or alternative embodiments to allow a purge gas to exit the inlet cap 104.

With reference to FIG. 2, the outlet 204 is adapted to allow fluid to pass from the filter 100. As depicted, the outlet 204 is an opening that, in operation, allows CDA to flow out of the filter 100. The CDA flowing out of the filter 100 may be compressed so as to supply the equipment with CDA. The outlet 204 is depicted as a simple opening. However, the outlet 204 may be any suitable opening that allows a fluid to pass to and from the filter 100. For example, the outlet 204 may be a threaded opening that is adapted to couple to a threaded fitting that couples the supplied CDA to the equipment. As will be described in the following, the outlet 204 may also be employed to allow the purge gas to enter the outlet cap 106.

The filtering media 206 is a material adapted to remove a one or more fluid components from a fluid. In the depicted embodiment, the filtering media 206 is comprised of a material that adsorbs moisture from air that flows through the filtering media 206. Also, the filtering media 206 may be a porous material that allows CWA to flow through it while adsorbing the moisture. In alternative embodiments, the filtering media 206 may be for adsorbing a component from a fluid other than air. For example, it may be desirable to adsorb oxygen from a gaseous mixture of nitrogen and oxygen to provide nitrogen.

The housing 208 substantially surrounds the filtering media 206. The housing 208 may be made of an alloy material such as stainless steel or aluminum although any suitable material may be used. For example, it may be desirable that the housing 208 be comprised of a non-corrosive material. In the present embodiment, a non-corrosive material may be desirable because the housing 208 may be exposed to water removed from the CWA. In alternative embodiments different materials may be selected for other reasons such as weight, costs, environmental factors or the like. For example, in an alternative embodiment, it may be desirable to reduce the weight when it is known the filter 100 is to be used in a less corrosive environment that utilizes a lower CDA pressure. Accordingly, a less expensive material yet appropriate material may be employed.

Still referring to FIG. 2, the housing 208 includes the housing inlet surface 210 and housing outlet surface 212 adapted to couple with the inlet cap 104 and the outlet cap 106, respectively. The housing inlet surface 210 and the housing outlet surface 212 have features that are adapted to couple with corresponding features in the inlet cap 104 and the outlet cap 106. For example, the housing inlet surface 210 and the housing outlet surface 212 may include shoulders that abut a corresponding surface in the inlet cap 104 and outlet cap 106, respectively. In the same or alternative embodiments, the surfaces of the housing inlet surface 210 and the housing outlet surface 212 may be slated so as to compressively fit in the inlet cap 104 and outlet cap 106. Such surfaces may both position and retain the filtering media tube 102 in the inlet cap 104 and outlet cap 106 alone or in combination with other positioning and retaining means. For example, the thru holes 112 in the inlet cap 104 and the may be employed to hold the filtering media tube 102 between the inlet cap 104 and the outlet cap 106.

Inlet Cap 104

Figure 3:
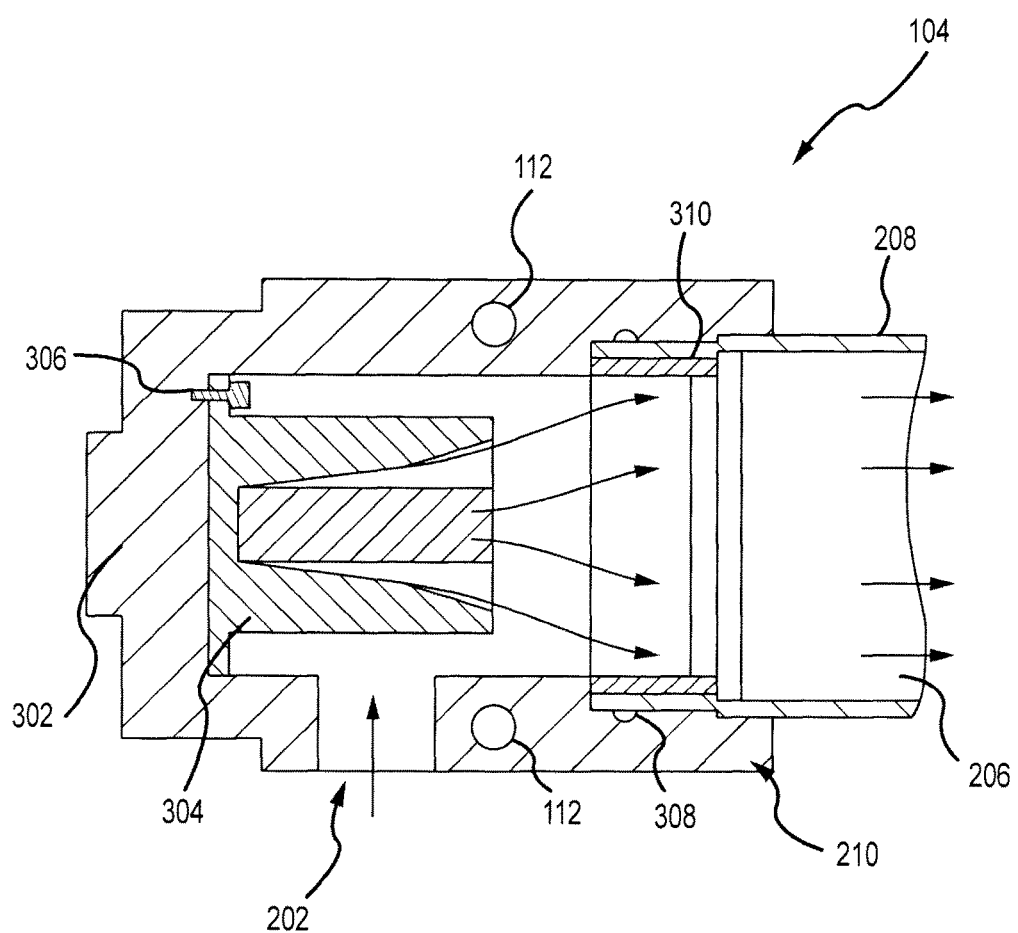
FIG. 3 shows the inlet cap 104 according to the invention.

FIG. 3 shows the inlet cap 104 according to the invention. The inlet cap 104 is adapted to receive a fluid and substantially uniformly distribute the fluid to the filtering media tube 102. The inlet cap 104 may receive the fluid flow that is substantially transversal to the major axis X of the filter 100. The inlet cap 104 includes an inlet cap body 302 with the inlet opening 202, an inlet baffle 304 coupled to the inlet cap body 302 with one or more baffle bolt 306. The baffle bolt 306 is depicted as a bolt although any suitable means of attachment may be employed. The inlet cap 104 also includes an inlet o-ring 308 pressed onto the outer portion of the filtering media tube 102 at the housing inlet surface 210 by the inlet cap body 302. An inlet spacer 310 is pressed against an inner surface of the housing 208 at the housing inlet surface 210. The inlet cap body 302, inlet baffle 304, and inlet spacer 310 may be comprised of an alloy that is resistant to corrosion such as stainless steel. It may be desirable that the inlet cap body 302, inlet baffle 304, and inlet spacer 310 be made of a corrosion resistant material because the CWA has moisture as a component. The inlet cap body 302, the inlet baffle 304, or the inlet spacer 310 may be formed from the same block of material. For example, the inlet cap body 302 and the inlet baffle 304 may be machined or cast from a block of stainless steel. Additionally or alternatively, the inlet body 302 and the baffle 304 may be formed from the same block of material.

The inlet cap body 302 is coupled to the filtering media tube 102 and receives and contains the fluid. As depicted, the inlet cap body 302 receives pressurized CWA at the inlet opening 202. The inlet cap body 302 is also depicted as providing structural support for the filtering media tube 102 at the housing inlet surface 210. The inlet cap body 302 may also retain or press the inlet spacer 310 against the filtering media 206 and the housing 208.

The inlet baffle 304 is adapted to substantially uniformly distribute the fluid. As depicted, the inlet baffle 304 includes features that are adapted to distribute fluid flowing through the inlet cap body 302. For example, the inlet baffle 304 may receive CWA flowing into the inlet cap body 302 at the inlet opening 202 in a transversal direction (depicted as a vertical arrow in FIG. 3 in the inlet opening 202) and substantially uniformly distribute the CWA towards the filtering media 206. The features of the inlet baffle 304 are discussed in more detail below with reference to FIG. 4.

Still referring to FIG. 3, the inlet o-ring 308 seals the inner portion of the filter 100. As depicted, the inlet o-ring 308 is made of polyurethane and is circumferentially surrounds the housing 208 and has a circular cross section. The inlet o-ring 308 is compressed between the inlet cap body 302 and the housing 208. The inlet o-ring 308 fluidly seals the inner portion of the inlet cap 104. Due to the seal, pressure of the CWA may be maintained. Any appropriate means of sealing the inner portion of the filter 100 may be employed. For example, it may be desirable to employ o-rings that are less susceptible to heat than o-rings comprised of polyurethane. Accordingly, alternative materials may be used.

The inlet spacer 310 allows fluid to pass between the inlet cap body 302 and the filtering media 206 and retains the filtering media 206. The inlet cap body 302 is depicted as cylindrically shaped. The inlet spacer 310 presses against the inner surface of the housing 208. The inlet spacer 310 also retains the filtering media 206 by pressing against the filtering media 206. The inlet spacer 310 is adapted to allow CWA to flow into the filtering media 206 while retaining the filtering media 206. The inlet spacer 310 may retain the filtering media 206 in a robust manner. That is, the inlet spacer 310 may retain the filtering media 206 so as to prevent the filtering media 206 from being moved by shocks or vibrations in the equipment that employs the filter 100. Preventing the filtering media 206 from moving may prevent the formation of particulate, cracks, gaps, or other undesirable features in the filtering media 206. The inlet spacer 310 may also allow fluid to pass between the inlet cap body 302 and the filtering media 206 without obstructing the flow. For example, the inlet spacer 310 may be perforated with holes to allow CWA to flow from the inlet cap body 302 to the filtering media 206.

Figure 4:
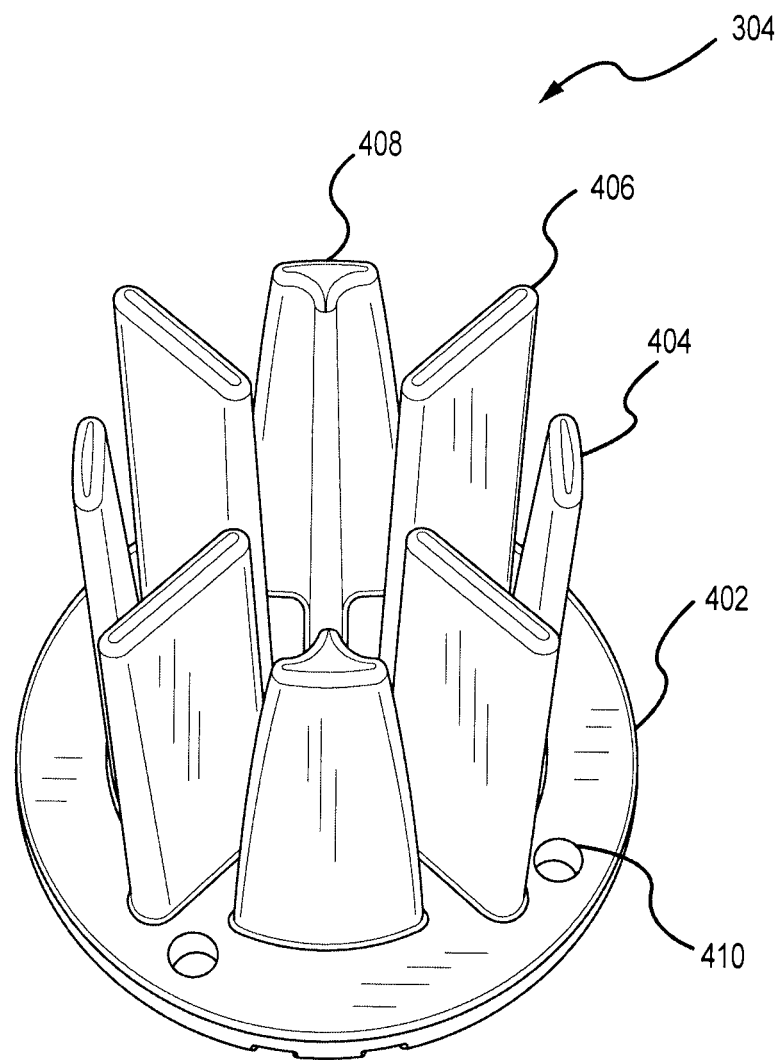
FIG. 4 shows the inlet baffle 304 according to the invention.

FIG. 4 shows the inlet baffle 304 according to the invention. The inlet baffle 304 includes a baffle base 402 that is coupled to tangential fins 404, radial fins 406, and profiled fins 408. The baffle base 402 may be coupled to the tangential fins 404, radial fins 406, and profiled fins 408 by any appropriate means such as welding, brazing, etc. The baffle base 402 may also be formed from the same block of material as the tangential fins 404, the radial fins 406, and the profiled fins 408 by any appropriate means such as casting, forging, etc. The baffle base 402, the tangential fins 404, the radial fins 406, and the profiled fins 408 may be made the same or different material. For example, the baffle base 402, the tangential fins 404, the radial fins 406, and the profiled fins 408 may be made of an alloy material such as aluminum or stainless steel. The materials may be selected so as to resist corrosion or other effects of the fluid that is redistributed by the inlet baffle 304. For example, in the present embodiment, the inlet baffle 304 may be comprised of material that is resistant to corrosion that would otherwise be caused by moisture in the CWA.

The baffle base 402 includes holes 410 that are employed to couple the inlet baffle 304 to the inlet cap body 302 as was discussed in the foregoing with reference to FIG. 3. When the inlet baffle 304 is coupled to the inlet cap body 302, the tangential fins 404, the radial fins 406, and the profiled fins 408 are arranged so they are substantially parallel with the major axis X of the filter 100. The tangential fins 404, the radial fins 406, and the profiled fins 408 are shaped (e.g., designed cross sectional profiles) to receive and substantially uniformly distribute a CWA flow that is parallel with the baffle base 402 to a CWA flow that is uniform and parallel with the major axis X of the filter 100. Although a particular configuration of the tangential fins 404, the radial fins 406, and the profiled fins 408 are depicted, any appropriate configuration may be employed to substantially uniformly distribute the fluid to the filtering media tube 102. For example a single fin may be employed to uniformly redistribute the fluid to the filtering media tube 102.

Figure 5:
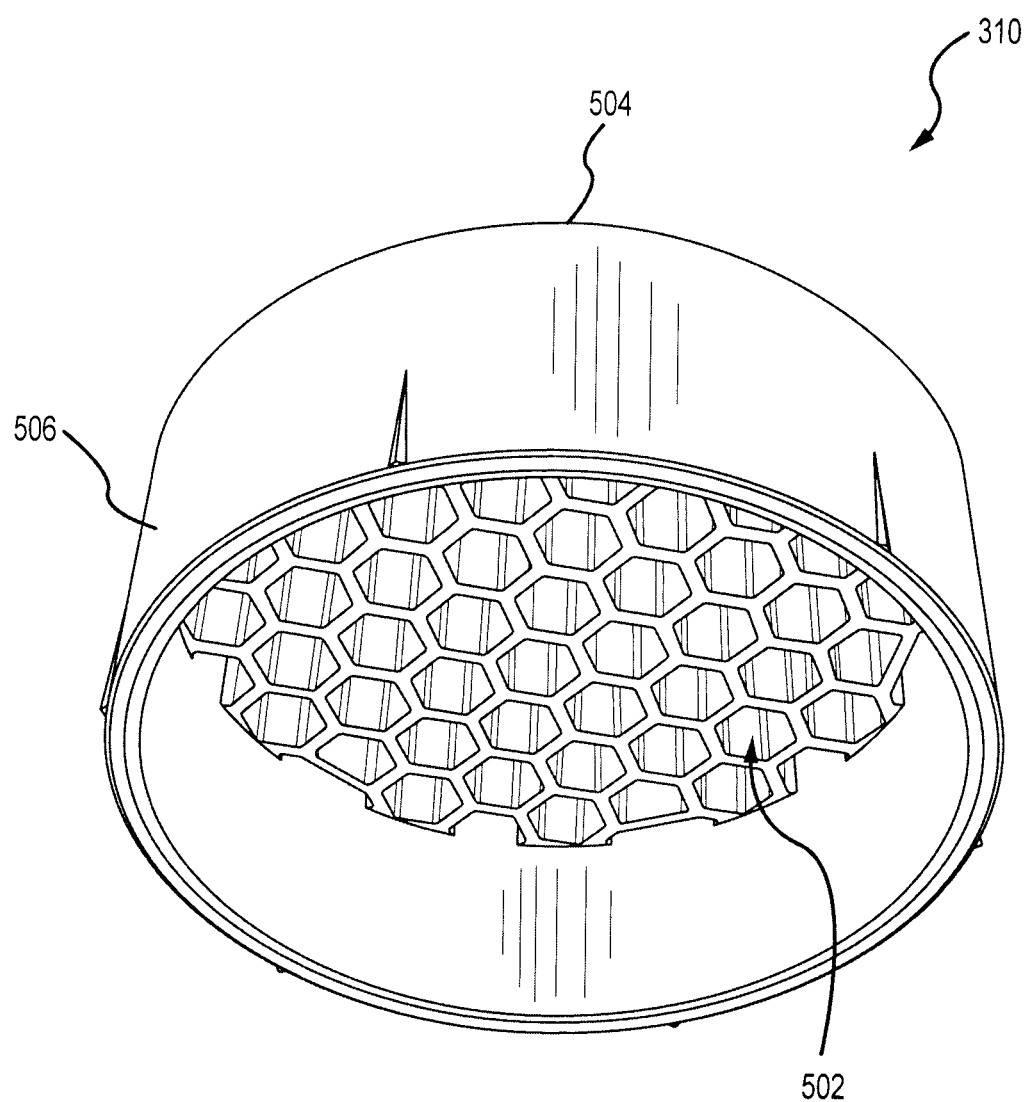
FIG. 5 shows the inlet spacer 310 according to the invention.

FIG. 5 shows the inlet spacer 310 according to the invention. The inlet spacer 310 is adapted to retain the filtering media 206 in the filtering media tube 102. The inlet spacer 310 includes fluid flow openings 502 that are formed in the retaining surface 504. The retaining surface 504 presses against the filtering media 206 as was discussed in the foregoing with respect to FIG. 3. The inlet spacer 310 also includes a spacer flange 506 that presses against the inner surface of the housing 208. As depicted, the retaining surface 504 and the spacer flange 506 are formed from the same material. However, any suitable means of forming the inlet spacer 310 may be employed.

The fluid flow openings 502 allow fluid to pass between the inlet cap 104 and the filtering media tube 102 through the retaining surface 504 while retaining the filtering media 206. In the depicted embodiment, the fluid flow openings 502 are hexagonal. The hexagonal shape may make the retaining surface 504 rigid while exposing an optimal amount of surface area of the filtering media 206 to the CWA that passes through the retaining surface 504. It may be desirable that the retaining surface 504 be rigid so as to ensure that the retaining surface 504 presses against the filtering media 206 without flexing. Accordingly, the retaining surface 504 may uniformly press against the filtering media 206. By uniformly pressing against the filtering media 206, the surface area utilized to press against the filtering media 206 may be minimized which minimizes the obstruction of the CWA entering the filtering media 206.

Still referring to FIG. 5, the lengths of each side of the fluid flow openings 502 may be selected to ensure that the retaining surface 504 is sufficiently rigid while exposing a maximum amount of the surface of the filtering media 206 to the CWA that passes through the retaining surface 504. The lengths of each side of the fluid flow openings 502 may also be selected to ensure that portions of the filtering media 206 do not pass through the fluid flow openings 502. For example, the fluid flow openings 502 may be small enough to prevent granules of the filtering media 206 from passing through the retaining surface 504. Although the fluid flow openings 502 are hexagonally shaped, other shapes may be employed in alternative embodiments. For example, circular holes may be employed.

With reference to FIGS. 3-5 and the arrows showing an optimized forward fluid flow, the fluid, such as CWA, flows into the inlet cap 104 at the inlet opening 202 in a direction that is substantially transversal to the major axis X of the filter 100. The CWA flows into the inlet baffle 304. The CWA is substantially uniformly distributed by the inlet baffle 304 to flow through the inlet spacer 310 towards the filtering media 206. That is, the inlet baffle 304 substantially uniformly distributes the CWA towards the filtering media 206 substantially coplanar with the major axis X of the filter 100. The inlet spacer 310 allows the CWA to enter the filtering media 206 with minimal obstruction. Accordingly, the CWA is substantially uniformly distributed to the filtering media 206. Such substantially uniformly distributed CDA flow optimally utilizes the filtering media 206 such that the operating life of the filtering media 206 is extended and unexpected failure is less likely which reduces equipment downtime.

Outlet Cap 106

Figure 6:
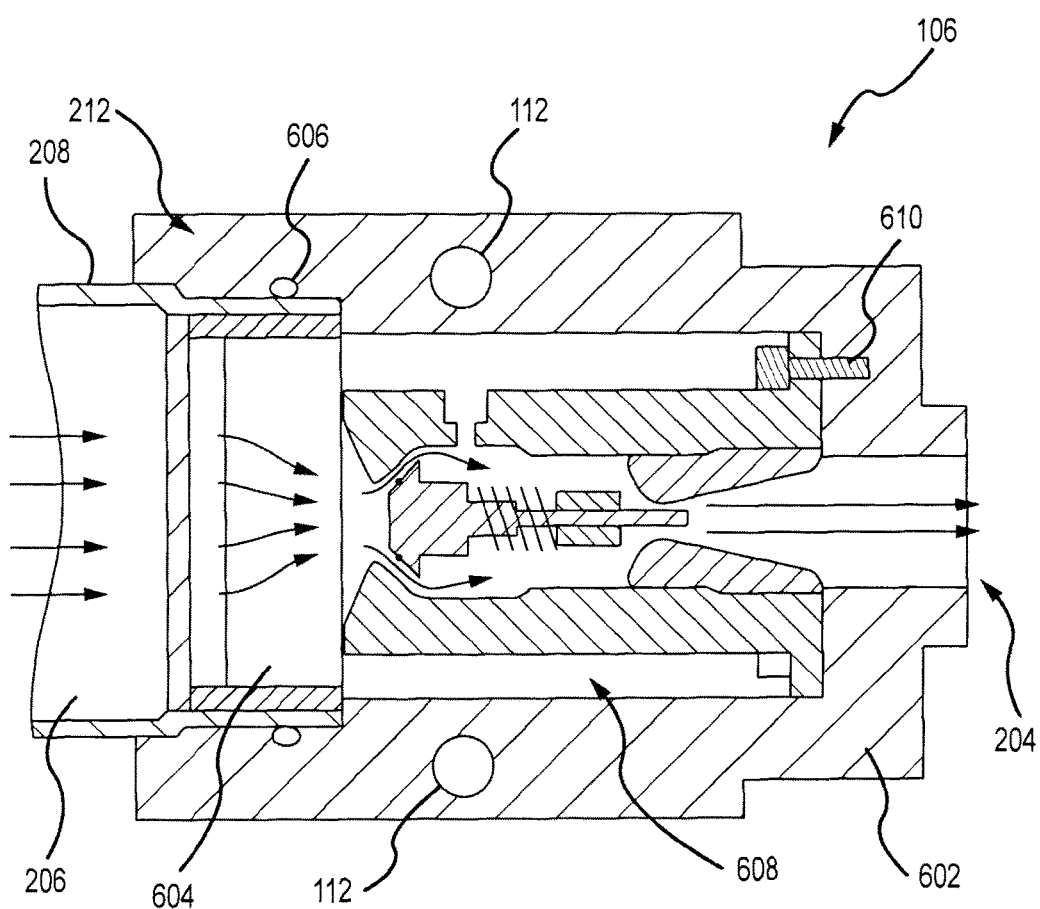
FIG. 6 shows the outlet cap 106 according to the invention.

FIG. 6 shows the outlet cap 106 according to the invention. The outlet cap 106 is adapted to receive filtered fluid from the filtering media tube 102. The outlet cap 106 may also be adapted to allow forward fluid flow while limiting a reverse fluid flow of the fluid. The outlet cap 106 may also prevent an undesired fluid flow rate in a variety of operating conditions. As depicted, the outlet cap 106 comprises an outlet cap body 602, an outlet spacer 604 that is pressed against the inside of the housing 208, an outlet o-ring 606 between the outlet cap body 602 and the housing 208 at the housing outlet surface 212. The outlet cap 106 also includes an outlet flow control assembly 608 that is coupled to the outlet cap body 602 via outlet assembly bolts 610 (one is denoted). The outlet assembly bolts 610 are depicted as typical bolts although any appropriate means of coupling the outlet flow control assembly 608 to the outlet cap body 602 may be employed. The outlet cap body 602, the outlet spacer 604, the outlet flow control assembly 608 and outlet assembly bolts 610 may an alloy material such as stainless steel. The material does not necessarily need to be corrosion resistant because the outlet cap 106 receives CDA from the filtering media 206. In effect, the materials in the outlet cap 106 may not need to be corrosion resistant although any appropriate material may be employed because the outlet cap 106 is exposed to filtered fluid. As with the inlet cap 104, portions of the outlet cap 106 may be formed from the same piece of material. For example, the outlet cap body 602 and the outlet spacer 604 may be cast or machined from a single piece of steel.

The outlet cap body 602 is adapted to retain the filtering media 206. As depicted, the outlet cap body 602 is cylindrically shaped. The outlet spacer 604 is substantially the same as the inlet spacer 310 described in the foregoing with reference to FIG. 5. Similar to the inlet spacer 310, the outlet spacer 604 presses against an inner surface of the housing 208 at the housing outlet surface 212. The outlet spacer 604 also includes openings that are similar to the openings 502 in the inlet spacer 310. The outlet o-ring 606 is compressed between the housing 208 and the outlet cap body 602 to provide a fluid seal.

Figure 7:
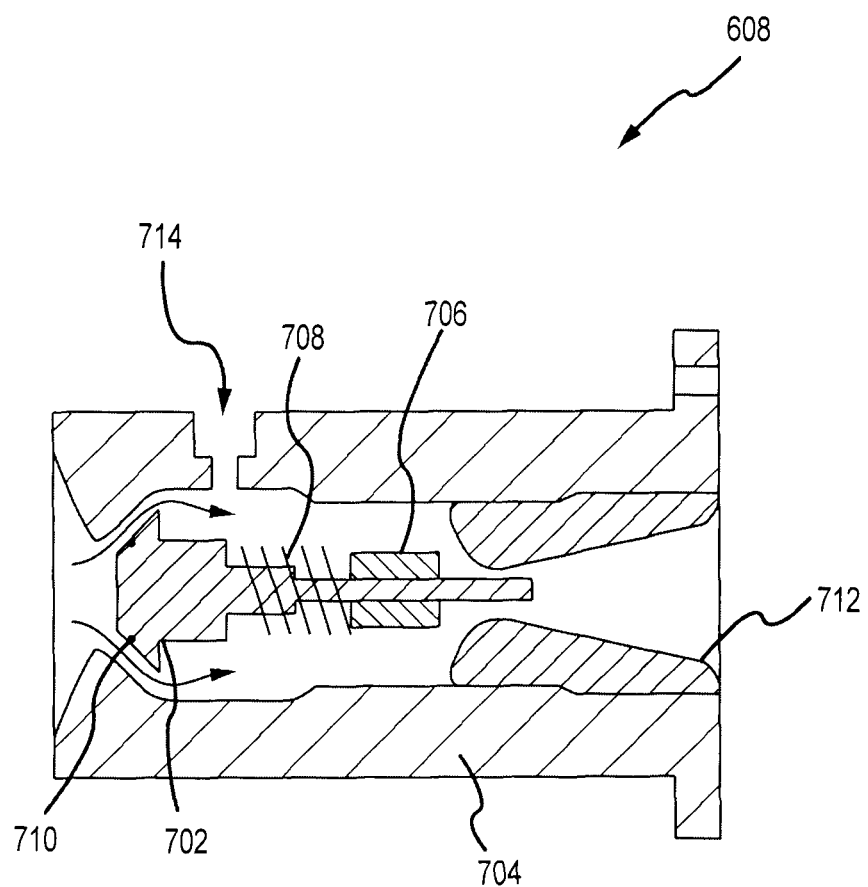
FIG. 7 shows the outlet flow control assembly 608 according to the invention.

FIG. 7 shows the outlet flow control assembly 608 according to the invention. The outlet flow control assembly 608 is adapted to allow a forward fluid flow while limiting a reverse fluid flow. The outlet flow control assembly 608 may also be adapted to allow a purge fluid flow. The outlet flow control assembly 608 includes a plunger 702 that is slidably coupled to an outlet flow valve housing 704 via the plunger guide 706. The plunger guide 706 extends from the inner wall of the outlet flow valve housing 704. A plunger spring 708 is compressed between the plunger 702 and the plunger guide 706. A plunger o-ring 710 is coupled to the plunger 702 at a sealing surface of the plunger 702. The outlet flow control assembly 608 includes an outlet nozzle 712 that is coupled to an inner portion of the outlet flow valve housing 704. The outlet flow valve housing 704 includes a purge flow orifice 714.

The plunger 702 is adapted to allow forward flow of a fluid while limiting the reverse flow of the fluid. As depicted, the plunger 702 is cylindrically shaped and is adapted to slide in the plunger guide 706. The plunger spring 708 presses the plunger guide 706 upstream. The plunger 702 presses against the inside surface of the outlet flow valve housing 704 when the plunger is providing a seal.

The outlet flow valve housing 704 is a cylindrically shaped. The plunger guide 706 extends from the inner surface of the outlet flow valve housing 704. The plunger guide 706 may be comprised of the same material as the outlet flow valve housing 704. In alternative embodiments, the plunger guide 706 may be a different material that is attached to the outlet flow valve housing 704 by appropriate means (e.g., brazing, welding, etc.). The plunger guide 706 allows the plunger 702 to move in a linear motion that is coaxial with the major axis X of the filter 100 while preventing movement that is transversal to the major axis X of the filter 100.

Still referring to FIG. 7, the plunger spring 708 is compressed between the plunger 702 and the plunger guide 706 so as to press the plunger 702 towards the filtering media tube 102. The plunger spring 708 is a coil spring comprised of spring steel. However, in alternative embodiments, the plunger spring 708 may be any appropriate means to pressing the plunger 702 downstream. The plunger 702 is pressed downstream so as to press the plunger o-ring 710 into the outlet flow valve housing 704.

The plunger o-ring 710 is a ring with a circular cross section although any appropriate shape may be employed. In alternative embodiments, the cross section profile may include a lip that is compressed as it is pressed against the outlet flow valve housing 704. The plunger o-ring 710 may be comprised of polyethylene. Other appropriate materials may be employed in the same or alternative embodiments. The plunger o-ring 710 may be polyurethane although any appropriate material may be employed. For example, the plunger 702 may not necessarily need to be corrosion resistant. However, the plunger o-ring 710 may be designed to account for the plunger o-ring 710 being repeatedly pressed into the outlet flow valve housing 704 and wear from the flowing CDA.

The outlet nozzle 712 is adapted to prevent an undesired fluid flow rate. For example, the outlet nozzle 712 may prevent the undesired fluid flow rate of the CDA if there is a change in the pressure drop across the outlet nozzle 712. As depicted, the outlet nozzle 712 is a cylindrical tube with a profile on the inner surface. The profile is selected (e.g., designed, fabricated, etc.) to as to prevent the undesired fluid flow rate. The profile is depicted as shaped in a manner similar to a hydrofoil. Accordingly, desired fluid flow rates through the outlet nozzle 712 are achieved for a variety of operating parameters.

The purge flow orifice 714 is adapted to allow a purge fluid flow. As depicted, the purge flow orifice 714 is a circular opening through the outlet flow valve housing 704. The purge flow orifice 714 allows the purge fluid flow through the outlet flow valve housing 704. The purge flow orifice 714 may be a small opening so that a pressure differential between the inner and outer surface of the outlet flow valve housing 704 must be relatively large for a significant amount of fluid to flow through the purge flow orifice 714. Although the purge flow orifice 714 is depicted as a circular opening in the outlet flow valve housing 704, the flow orifice 714 may be an opening through the plunger 702. Additionally or alternatively, there may be more than one purge flow orifice 714. For example, there may be two purge flow orifice 714 in the outlet flow valve housing 704 and one purge flow orifice 714 in the plunger 702.

With reference to FIGS. 6 and 7 and the arrows showing an optimized forward fluid flow, the filtering media 206 provides the CDA to the outlet cap 106. The CDA flows into the outlet cap 106 via the outlet spacer 604. The outlet spacer 604 allows the CDA to flow into the outlet flow control assembly 608 which presses the plunger 702 downstream. The plunger 702 linearly translates towards the outlet 204 and compresses the plunger spring 708 thereby allowing an opening to form between the plunger 702 and the outlet flow valve housing 704. The CDA flows towards the outlet nozzle 712 into the outlet flow valve housing 704. The CDA flows through the outlet nozzle 712 towards the outlet 204. The profile of the outlet nozzle 712 may restrict the fluid flow to prevent undesired fluid flow rates of the fluid. Accordingly, the filter 100 may provide CDA to the equipment at desired fluid flow rates in various operating conditions.

Figure 8:
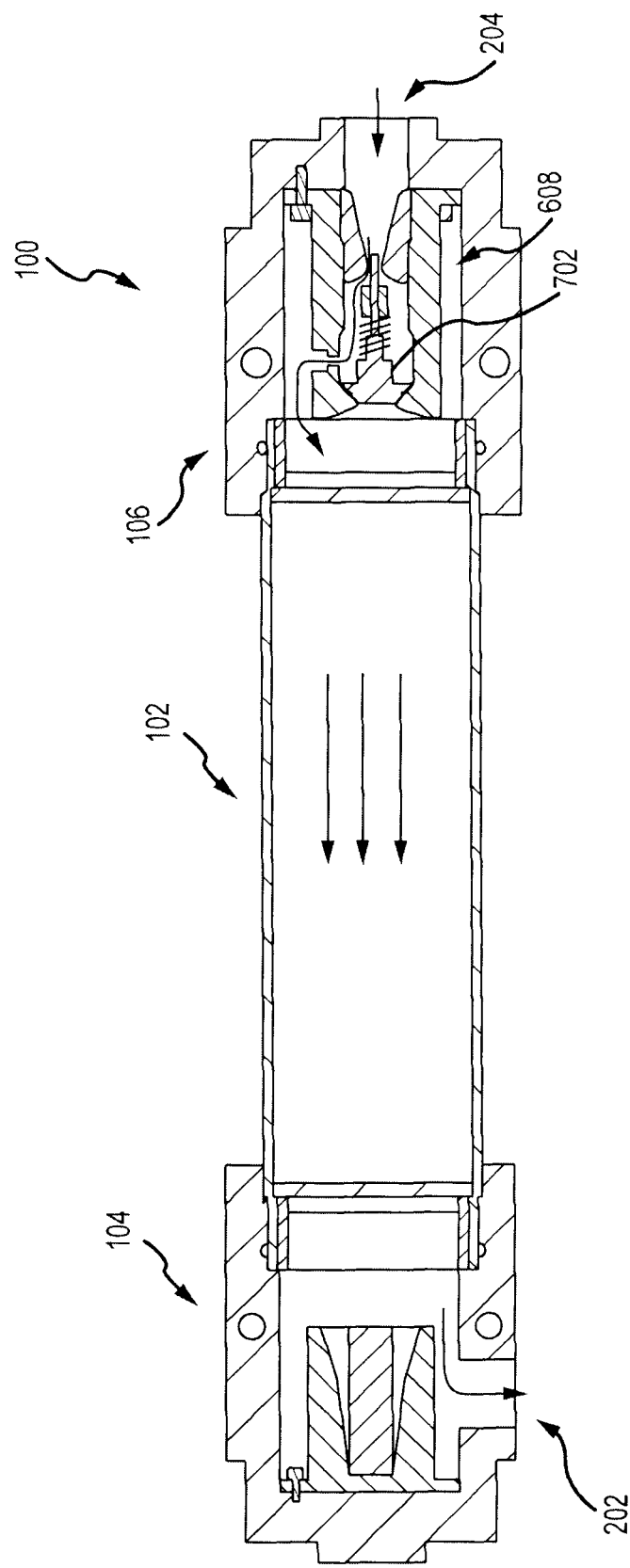
FIG. 8 shows the filter 100 with arrows depicting a reverse fluid flow according to the invention.

FIG. 8 shows the filter 100 with arrows depicting a purge fluid flow according to the invention. Even though the present invention substantially uniformly distributes the fluid to the filtering media 206 during forward fluid flow operation, it may be desirable to remove undesirable components such as moisture or other contaminants from the filtering media 206. In the purge fluid flow operation, the fluid flows from the outlet 204 through the outlet nozzle 712 towards the plunger 702. The plunger 702 is pressed in the direction of the purge fluid flow against the outlet flow valve housing 704 by the plunger spring 708 (not shown) as well pressure from the purge fluid flow. The plunger 702 provides a seal that limits the reverse fluid flow. As depicted, the purge fluid flow passes out of the outlet flow control assembly 608 through the purge flow orifice 714 and the filtering media 206 towards the inlet cap 104. As the fluid flows through the filtering media 206 the fluid carries undesirable components from the filtering media 206, through the inlet spacer 310 and out the inlet opening 202 in the 104. The fluid may also carry undesirable components from other portions of the filter 100 such as moisture on the baffle 304. Accordingly, the operating life of the filtering media 206 is extended and unexpected failure is less likely to occur which reduces equipment downtime.

The various embodiments of the invention can be implemented to provide several advantages, if desired. For example, the inlet cap 104 may substantially uniformly distribute a fluid to the filtering media tube 102 for filtering the fluid. The filtering media tube 102 may include the inlet spacer 310 and the outlet spacer 604 to retain the filtering media 206 in the filtering media tube 102 while allowing the fluid to pass through. The outlet cap 106 may include a plunger 702 that allows forward fluid flow while limiting reverser fluid flow of the fluid. The outlet cap 106 may also be adapted to prevent an undesirable fluid flow rate in a variety of operating conditions. Accordingly, the operating life of the filtering media 206 may be extended thereby reducing equipment downtime.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other devices and method, and not just to the embodiments described above and shown in the accompanying figures. Accordingly, the scope of the invention should be determined from the following claims.

We claim:

1. A filter (100) with optimized fluid flows to remove one or more components from a fluid, comprising:
   a filtering media tube (102) adapted to remove the one or more components from the fluid; and
   an inlet cap (104) coupled to the filtering media tube (102), the inlet cap (104) adapted to receive the fluid flow that is substantially transversal to a major axis X of the filter (100), wherein the inlet cap (104) further comprises an inlet baffle (304) adapted to uniformly distribute the fluid to the filtering media tube (102), wherein the inlet baffle comprises a baffle base (402) and a plurality of fins (404, 406, 408).

2. A method of forming a filter (100) with optimized fluid flows to remove one or more components from a fluid, comprising:
providing a filtering media tube (102) to remove the one or more components from the fluid; and
forming and coupling an inlet cap (104) to the filtering media tube (102) to receive the fluid flow substantially transversal to a major axis X of the filter (100), wherein forming the inlet cap (104) includes forming an inlet baffle (304) adapted to uniformly distribute the fluid to the filtering media tube (102), wherein the inlet baffle (304) comprises a baffle base (402) and a plurality of fins (404, 406, 408).

3. The method of claim 2, further comprising:
forming and coupling an outlet cap (106) to the filtering media tube (102) to receive the fluid from the filtering media tube (102) and allow a forward fluid flow while limiting a reverse fluid flow of the fluid.

4. The method of forming the filter (100) of claim 2 wherein forming the outlet cap (106) includes forming an outlet nozzle (712) adapted to prevent an undesired fluid flow rate of the fluid.

5. The method of forming the filter (100) of claim 2 wherein forming the outlet nozzle (712) includes forming a profile on an inner surface on an outlet nozzle (712) that is selected to prevent an undesired fluid flow rate of the fluid.

6. A method of removing one or more components from a fluid with a filter (100) with optimized fluid flows having a major axis X, comprising:
receiving the fluid with an inlet cap (104) in a direction substantially transversal to the major axis X of the filter (100);
uniformly distributing the fluid to a filtering media tube (206) with the inlet cap (104), the inlet cap (104) comprising an inlet baffle (304) adapted to uniformly distribute the fluid to the filtering media tube (102), wherein the inlet baffle comprises a baffle base (402) and a plurality of fins (404, 406, 408), with a flow substantially parallel with the major axis X of the filter (100); and
filtering the one or more components from the fluid.

7. The method of claim 6, further comprising allowing a forward fluid flow while limiting a reverse fluid flow of the fluid.

8. The method of claim 6, further comprising preventing the undesired fluid flow rate of the fluid with an outlet nozzle (712).

9. The method of claim 6, further comprising flowing a purge fluid through an outlet cap (106) adapted to allow the forward flow while limiting the reverse fluid flow of the fluid.

10. The method of claim 9, wherein flowing the purge fluid includes pressing a plunger (702) in the direction of the purge fluid flow.

11. The filter (100) of claim 1, further comprising an outlet cap (106) adapted to receive fluid from the filtering media tube (102) and allow a forward fluid flow while limiting a reverse fluid flow of the fluid.

12. The filter (100) of claim 11, wherein the outlet cap (106) includes a plunger (702) adapted to allow the forward fluid flow of the fluid through while limiting the reverse fluid flow.

13. The filter (100) of claim 11, wherein the outlet cap (106) is adapted to receive the fluid from the filtering media tube (102) and prevent an undesired fluid flow rate of the fluid.

* * * * *